United States Patent
Hutchinson

(10) Patent No.: US 7,913,389 B2
(45) Date of Patent: Mar. 29, 2011

(54) METHOD OF MAKING A FLAPPER VALVE ASSEMBLY

(75) Inventor: Robert M. Hutchinson, Moneta, VA (US)

(73) Assignee: Parker-Hannifin Corporation, Cleveland, OH (US)

( * ) Notice: Subject to any disclaimer, the term of this patent is extended or adjusted under 35 U.S.C. 154(b) by 775 days.

(21) Appl. No.: 11/935,072

(22) Filed: Nov. 5, 2007

(65) Prior Publication Data

US 2008/0128038 A1 Jun. 5, 2008

Related U.S. Application Data

(60) Provisional application No. 60/864,229, filed on Nov. 3, 2006, provisional application No. 60/976,067, filed on Sep. 28, 2007.

(51) Int. Cl.
  *B21D 51/16* (2006.01)
  *B23P 17/00* (2006.01)
  *F16K 1/22* (2006.01)
  *F16K 43/00* (2006.01)

(52) U.S. Cl. .......... 29/890.127; 29/890.12; 29/412; 137/15.18; 137/15.25; 251/305; 251/306

(58) Field of Classification Search ........... 29/890.12, 29/890.127, 412, 415; 137/15.18, 15.25, 137/862; 251/305–307
See application file for complete search history.

(56) References Cited

U.S. PATENT DOCUMENTS

| | | | |
|---|---|---|---|
| 4,158,352 A | 6/1979 | Blatter | |
| 4,771,740 A | 9/1988 | Koike | |
| 4,856,558 A | 8/1989 | Kardos | |
| 5,715,782 A | 2/1998 | Elder | |
| 6,235,231 B1 | 5/2001 | Martin | |
| 6,598,854 B1 * | 7/2003 | Jessberger et al. | 251/214 |
| 6,612,325 B2 | 9/2003 | Rentschler et al. | |
| 6,626,421 B2 | 9/2003 | Torii et al. | |
| 6,626,422 B2 | 9/2003 | Kaiser | |
| 6,698,717 B1 | 3/2004 | Brookshire et al. | |
| 6,877,723 B2 | 4/2005 | Martinsson et al. | |
| 7,624,750 B2 * | 12/2009 | Hutchinson et al. | 137/15.25 |
| 2004/0003841 A1 * | 1/2004 | Rentschler et al. | 137/15.25 |
| 2005/0241614 A1 * | 11/2005 | Madeira | 123/336 |
| 2006/0278268 A1 | 12/2006 | Hutchinson et al. | |

* cited by examiner

*Primary Examiner* — David P Bryant
*Assistant Examiner* — Alexander P Taousakis
(74) *Attorney, Agent, or Firm* — Renner, Otto, Boisselle & Sklar LLP

(57) ABSTRACT

A flapper valve assembly and a method of making the same. The flapper valve assembly is mountable to a manifold as a unit. The flapper valve assembly can include bearings that do not require assembly on a shaft of the flapper valve. More particularly, the flapper valve can include a shaft having one or more flap portions and one or more bearing portions molded in place on the shaft as a unitary structure. The bearing portions are separated from adjacent flap portions and/or the shaft thereby forming a bearing that rotates independently of flap portions on the shaft. The flapper valve is mounted to a flapper valve carrier that can include sealing members for facilitating a tight seal between the flapper valve and the carrier and/or the carrier and a manifold.

6 Claims, 8 Drawing Sheets

METHOD OF MAKING A FLAPPER VALVE ASSEMBLY

RELATED APPLICATIONS

This application claims the benefit of U.S. Provisional Application No. 60/864,229 filed Nov. 3, 2006, and U.S. Provisional Application No. 60/976,067 filed Sep. 28, 2007, both of which are hereby incorporated herein by reference in their entireties.

FIELD OF THE INVENTION

The present invention relates generally to a flapper valve. More particularly, the invention relates to a flapper valve assembly for controlling airflow in an intake system of an internal combustion engine.

BACKGROUND OF THE INVENTION

It is possible to improve the performance and efficiency of an internal combustion engine by regulating the flow of air into a combustion chamber. One way in which to maintain a more uniform flow of air is to provide a valve in the intake of the engine to throttle air flow. Such valves, commonly referred to as flapper valves or butterfly valves, are generally constructed from a metal shaft to which metal flaps are welded or riveted for rotation with the shaft. An alternative construction is a shaft and flaps made of a continuous piece of plastic. In either type of valve construction, bearings are typically required for rotationally supporting the shaft. Typical bearings, in particular bushings, used for supporting flapper valves are either a split two-piece type bearing installed after the valve is constructed, or a single piece bearing that is slipped onto the shaft prior to attaching the flaps to the shaft. Such designs thus require several steps to assemble and/or install in an intake of an engine (e.g., assemble flaps and bearings on shaft, mount shaft on intake, etc.) and, therefore, involve increased time and labor cost for assembly.

SUMMARY OF THE INVENTION

A flapper valve assembly and a method of making the same. The flapper valve assembly is mountable to a manifold as a unit. The flapper valve assembly can include bearings that do not require assembly on a shaft of the flapper valve. More particularly, the flapper valve can include a shaft having one or more flap portions and one or more bearing portions molded in place on the shaft as a unitary structure. The bearing portions are separated from adjacent flap portions and/or the shaft thereby forming a bearing that rotates independently of flap portions on the shaft. The flapper valve is mounted to a flapper valve carrier that can include sealing members for facilitating a tight seal between the flapper valve and the carrier and/or the carrier and a manifold.

In an exemplary embodiment, the flapper valve assembly does not require assembly of bearings on the shaft. More particularly, the flapper valve assembly comprises a flapper valve carrier, a rotatable shaft, at least one flap on the shaft fixed for rotation with the shaft, and at least one bearing for supporting the shaft for rotation relative to the carrier. The bearing is a molded bearing separated from the at least one flap and the shaft. The shaft is rotatable to move the at least one flap between a sealed position and an unsealed position when the flapper valve assembly is mounted to the intake. The bearings can be snapped into place on the carrier.

The flapper valve assembly can include at least one sealing surface for sealing the flapper valve assembly to the intake manifold when mounted thereto. The carrier can include at least one opening therein that the flapper valve is configured respectively open and close to regulate the flow of air therethrough. The bearing can be made of nylon and can be a continuous annular single piece.

In accordance with another aspect of the invention, a method of making a flapper valve assembly that is mountable as a unit to an intake manifold of an internal combustion engine comprises molding at least one flap and at least one bearing portion as a unitary structure on a shaft, separating the at least one bearing portion from the at least one flap so that the bearing portion can rotate independently of the flap on the shaft, and mounting the at least one bearing portion to a flapper valve carrier so that the shaft is rotatable to move the at least one flap between a sealed position and an unsealed position.

The separating the at least one bearing portion from the at least one flap can include cutting. The molding at least one flap and at least one bearing portion as a unitary structure on a shaft can include injection molding. The at least one flap can be secured against rotation relative to the shaft, such as by molding the at least one flap onto a non-circular portion of the shaft, whereby the flap is secured against rotation relative to the shaft.

In accordance with another aspect, a flapper valve carrier comprises a body, at least one flapper valve support extending from the body, and at least one bearing for supporting a shaft of a flapper valve for rotation relative to the carrier. The at least one bearing can be integral with the at least one support, such as by molding the bearing to the carrier, or by welding the bearing to the carrier.

In accordance with another aspect, a flapper valve assembly mountable as a unit to an intake manifold of an internal combustion engine comprises a flapper valve carrier, a rotatable shaft, at least one flap on the shaft fixed for rotation with the shaft, and at least one bearing for supporting the shaft for rotation relative to the carrier. The at least one bearing can be snapped into a recess in a support of the flapper valve carrier, and the shaft can be rotatable to move the at least one flap between a sealed position and an unsealed position when the flapper valve assembly is mounted to the intake. The recess can be bounded by a first and second wall and can be semi-circular in cross section and sized so as to restrict removal of the bearing once snapped in place.

Further features of the invention will become apparent from the following detailed description when considered in conjunction with the drawings.

DETAILED DESCRIPTION

Figure 1:
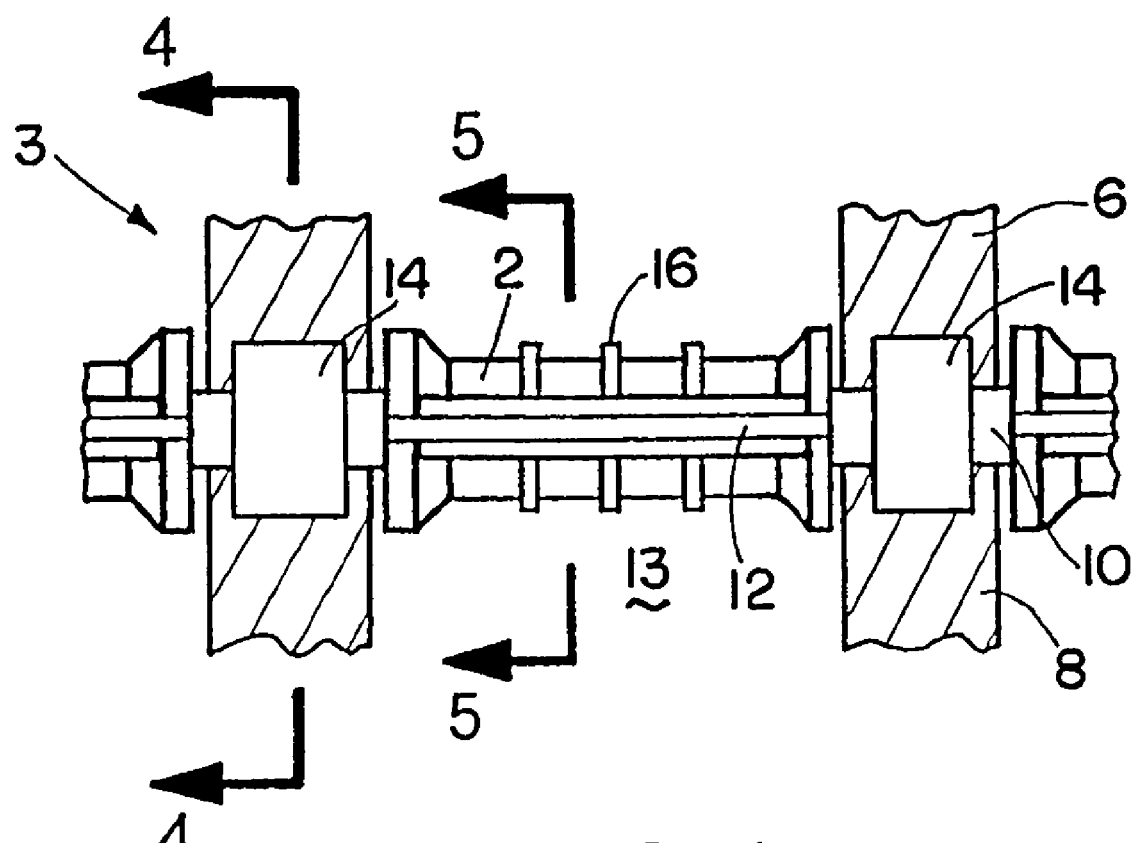
FIG. 1 is a partial cross-sectional view of an exemplary flapper valve in accordance with the present invention, shown installed in a manifold assembly.

Referring now to the drawings in detail, and initially to FIG. 1, an exemplary flapper valve 2 in accordance with the present invention is shown in a manifold assembly, generally indicated by reference numeral 3. The manifold assembly 3 generally includes an upper housing portion 6 mated with a lower housing portion 8. The flapper valve 2 generally comprises a shaft 10 and one or more flap portions 12 spaced apart along the length of, and rotatable with, the shaft 10. One or more bearings 14, retained between the upper housing portion 6 and lower housing portion 8 in FIG. 1, support the shaft 10 for rotation within the manifold assembly 4. An actuator (not shown) is typically provided at an end of the shaft 10 for rotating the shaft 10 so that the flap portions 12 can regulate the flow of air through passageways 13 of the manifold assembly 3.

The flap portions 12 can be any suitable shape, typically corresponding to the cross-sectional shape of the passageways 13. The illustrated flap portions 12 have a generally rectangular shape with rounded corners. A plurality of reinforcing ribs 16 are provided for enhancing the structural rigidity of each flap portion 12.

Figure 2:
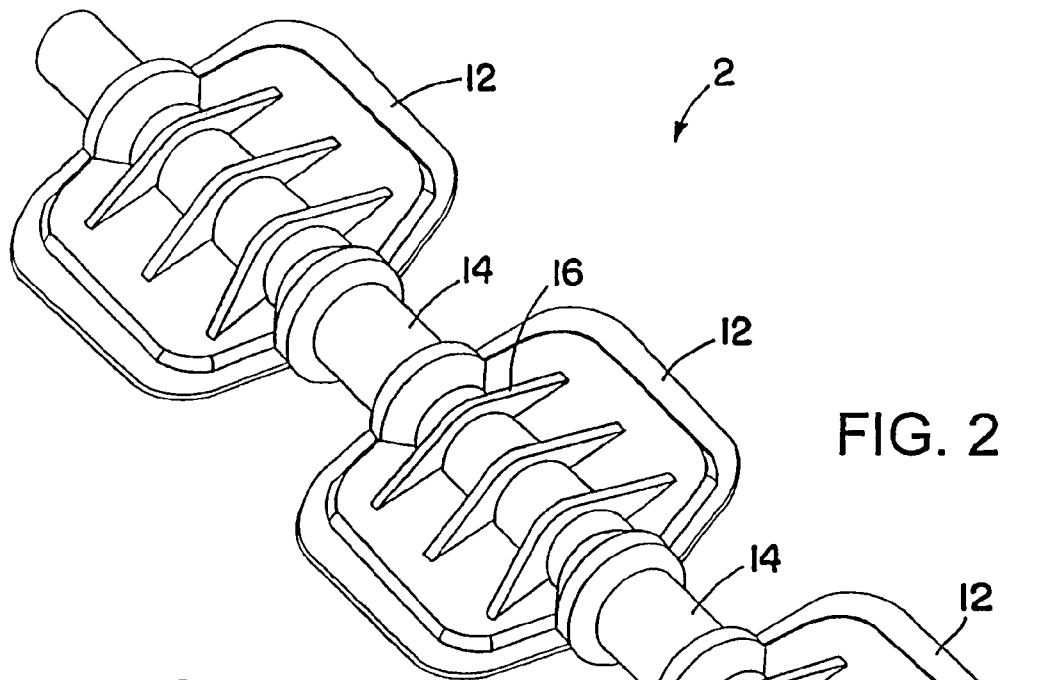
FIG. 2 is a perspective view of the flapper valve of FIG. 1.
Figure 3:
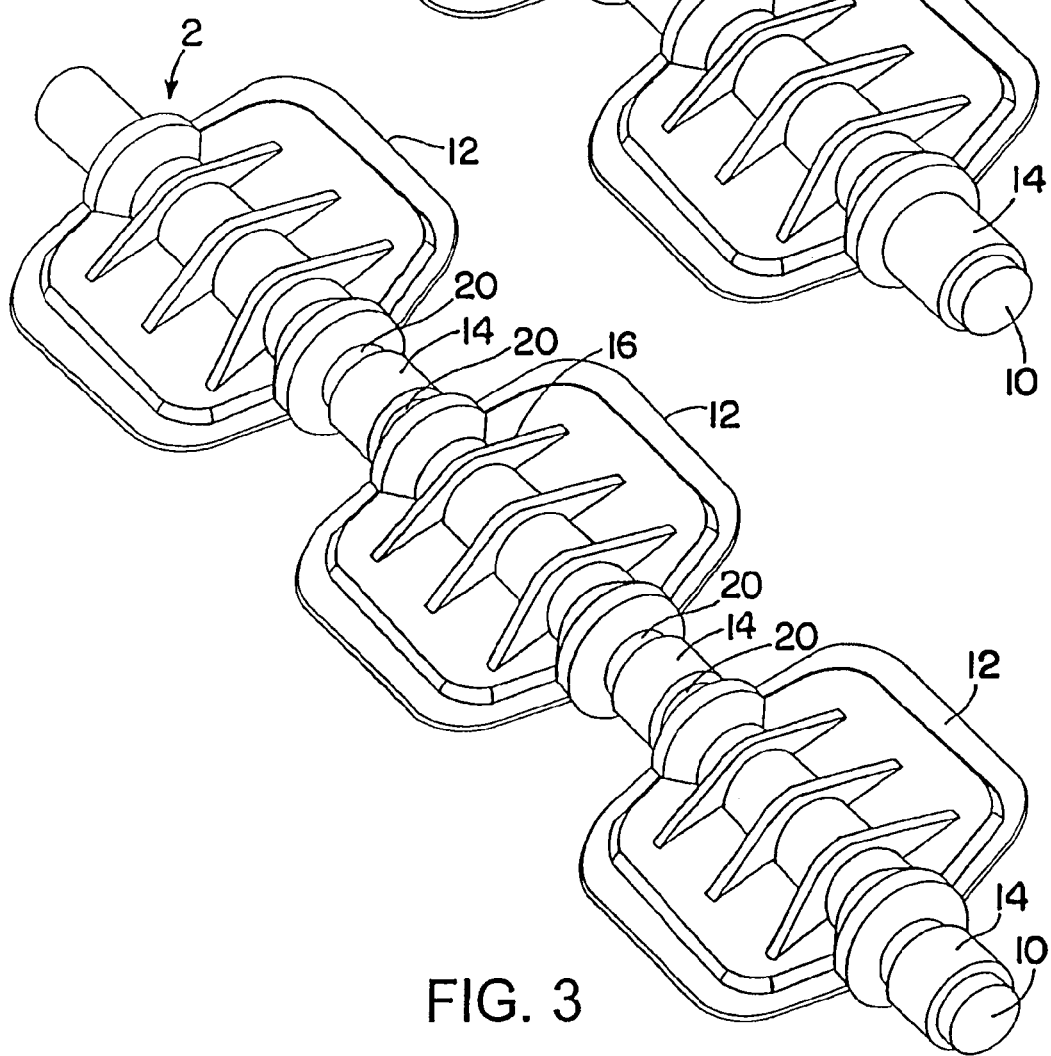
FIG. 3 a perspective view of a flapper valve prior to separation of the bearing portions from the flap portions in accordance with an embodiment of the invention.

The flapper valve 2 in FIGS. 1 and 2 is formed by first molding the flap portions 12 and the bearing portions 14 to the shaft 10 as a unitary structure, preferably of plastic. Such unitary structure is shown in FIG. 3. As shown, the bearing portions 14 are integrally joined to the flap portions 12. Any suitable molding process can be used for molding the unitary structure, such as an injection molding process. The bearing portions 14 are then separated from the adjacent flap portions 12 in a second separating operation thereby resulting in the flapper valve of FIGS. 1 and 2. Any suitable method of separating the bearing portions 14 can be used, such as machining a groove with a blade.

Figure 4:
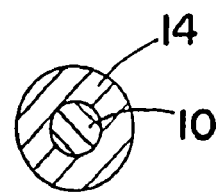
FIG. 4 is a cross-sectional view through a flap portion of the flapper valve of FIG. 1, taken along the line 4-4 in FIG. 1.
Figure 5:
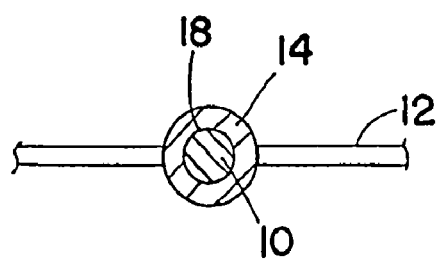
FIG. 5 is a cross-sectional view through a bearing portion of the flapper valve of FIG. 1, taken along the line 5-5 in FIG. 1.

Turning to FIG. 4, the portions of the shaft 10 over which the bearing portions 14 are molded are generally smooth and circular such that the bearing portions 14 can rotate independently of the shaft 10 after the bearing portions 14 are separated from the flap portions. In contrast, and as shown in FIG. 5, the flap portions 12 are secured to the shaft 10 for rotation therewith by projections and/or recesses on the outer diameter of the shaft 10. As illustrates, the shaft 10 includes a non-circular portion, flat 18, that forms a mechanical interlock between the flap portion 12 and the shaft 10. As an alternative, an outer diameter of the shaft 10 can be knurled to provide projections and/or recesses to secure the flap portions 12 for rotation with the shaft 10.

Returning to FIG. 2, it will be appreciated that a portion of the molded material has been removed leaving a gap 20 between each bearing portion 14 and the adjacent flap portion 12. Accordingly, the bearing portions 14 are free to move axially along the shaft 10 between adjacent flap portions 12. By removing this portion of the molded material, the flapper valve 2 can be mounted in a manifold with an amount of axial play in the shaft 10 to permit the flap portions 12 to be aligned with the passageways that they will be configured to open and close. This can be advantageous, for example, in applications with large dimensional tolerances and for accommodating differing rates of thermal expansion of the shaft 10 and the molded material.

Figure 6:
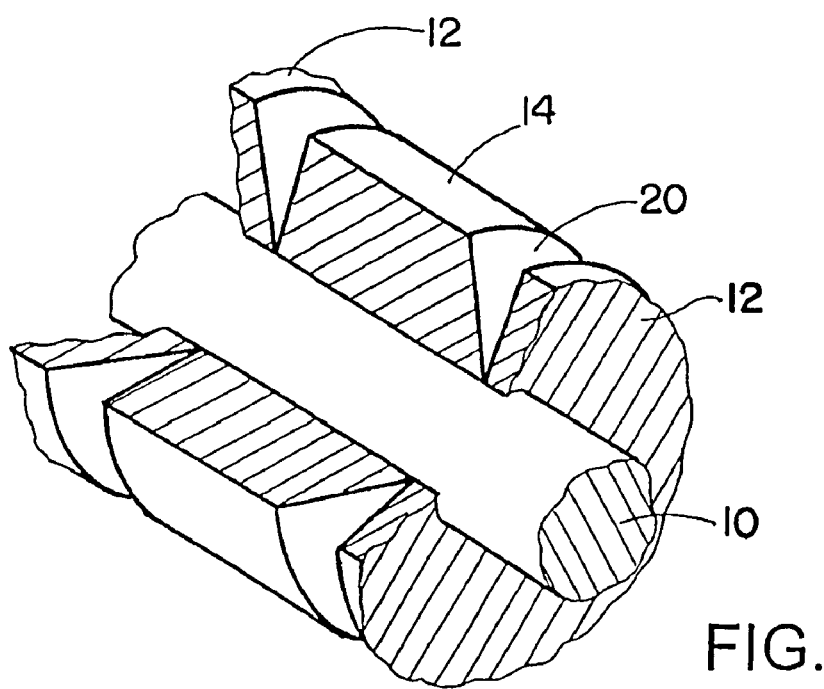
FIG. 6 is an enlarged partial cross-sectional view of a flapper valve wherein the bearing has been separated from adjacent flap portions by die cutting.

In FIG. 6, a bearing portion has been separated from the adjacent flap portions 12 by a die-cutting operation. Accordingly, a tapered knife or similar cutting device has been used to separate the bearing portions 14 from the flap portions 12 thereby forming a V-shape gap 20. Such a cutting device can include semicircular knife members (dies) mounted in a press that is configured to compressively engage the molded material to separate the bearing portions 14 from the flap portions 12. The V-shape gap 20 results in a bearing portion 14 whose radially outer axial length dimension is smaller then its radially inner axial length dimension. As such, the bearing portion 14 generally is fixed axially between adjacent flap portions 12 and, thus, when mounted the flapper valve 2 will have reduced or no axial play as compared to the embodiment shown and described in connection with FIGS. 1-5.

By forming the flap portions 12 and bearing portions 14 as a unitary structure on the shaft 10, and subsequently separating the bearing portions 14 from the flap portions 12 in a separating operation, the flapper valve 2 is formed without having to separately install or assemble bearings and/or flap portions on the shaft 10.

The flapper valve 2 of the present invention can include a rubber overmolding layer on the flap portions 12 and/or the bearings portions 14. The rubber overmolding layer can be applied to the flap portions 12 and/or bearing portions 14 before or after the bearing portions 14 are separated, and can facilitate a tight seal between the flap portions 12 and ports or passageways of a manifold when the flapper valve 2 is installed.

It will be appreciated that the bearings portions 14 as described above are free to rotate independently of the shaft 10 after separation from the flap portions 12. In some instances, residual interlocking forces between the bearing portions 14 and shaft 10 will prevent free rotation of the bearing portions 14. Accordingly, the bearing portions 14 may need to be initially rotated relative to the shaft 10 to overcome any residual interlocking forces to permit free rotation of the bearing portions 14.

The bearing portions 14 can be made of any suitable material, such as Delrin® manufactured by Dupont. Materials such as Delrin® that are lightweight, durable, low wear, and low friction are ideal for use as a bearing material in accordance with the present invention.

Figure 7:
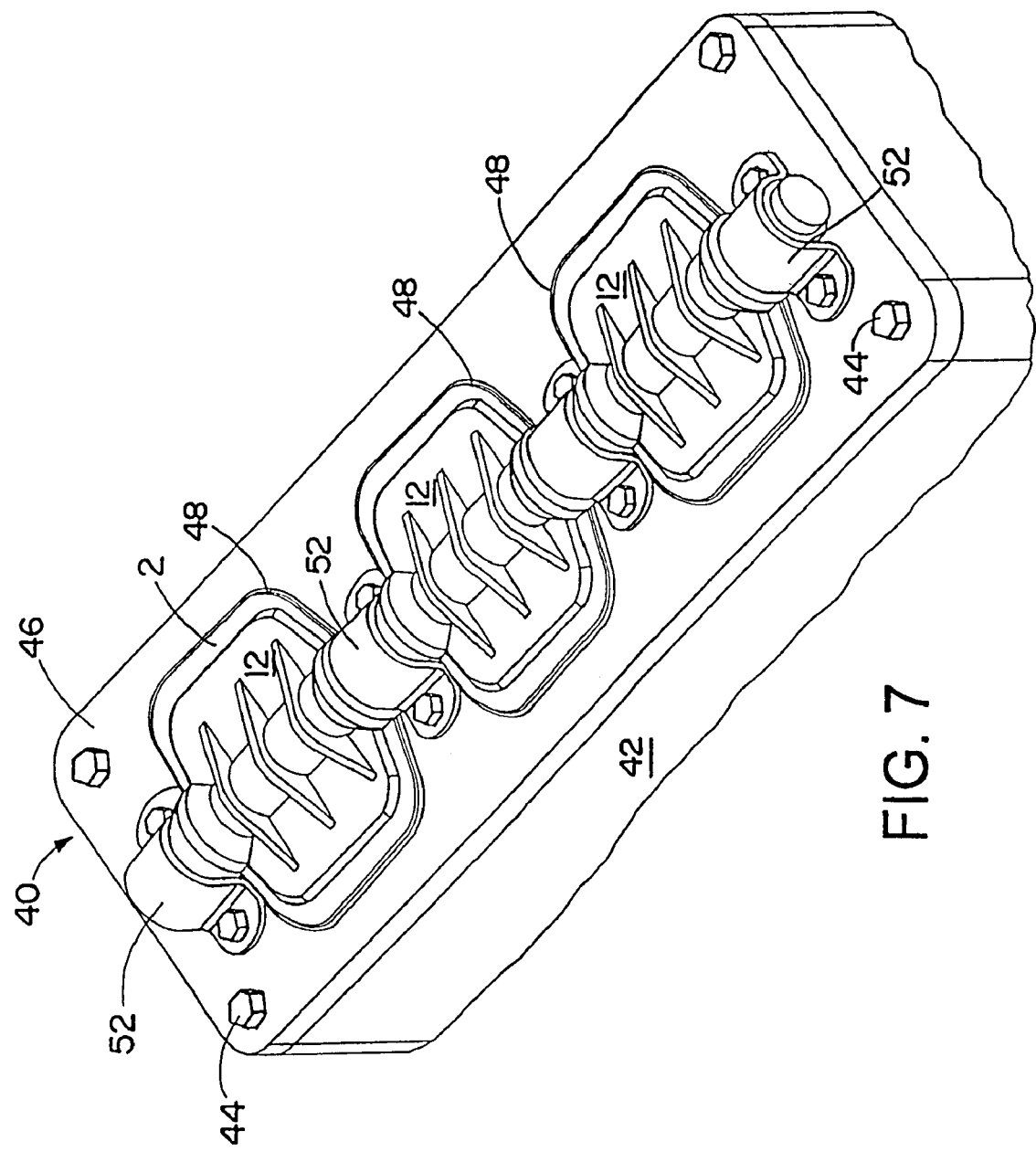
FIG. 7 is a perspective view of an exemplary flapper valve assembly in accordance with the present invention.

Turning now to FIG. 7, an exemplary flapper valve assembly is illustrated and generally indicated by reference numeral 40. The flapper valve assembly 40 is mounted to a manifold 42, such as an intake manifold of an engine, for example. The flapper valve assembly 40 is mounted to the manifold 42 as a unit via suitable fasteners, such as bolts 44.

The flapper valve assembly 40 includes the flapper valve 2 shown and described in FIGS. 1-6 mounted to a flapper valve carrier 46. The carrier 46 has a plurality of openings 48 that correspond to openings (not shown) in the manifold 42. The flapper valve assembly 40 secured to the manifold such that openings 48 in the carrier 44 align with the respective openings in the manifold 42. The flaps 12 of the flapper valve 2 are configured to move between open and closed positions to respectively permit and block the flow of air through the openings 48 in the carrier 44 and, consequently, respective openings in the manifold 42.

The flapper valve 2 is supported for movement between open and closed positions via the bearing portions 14 which are secured to supports 52 on the carrier 46. The supports 52 secure the bearings 14 to the carrier 46 while permitting the shaft 10 and flaps 12 to rotate. Any suitable mechanism for securing the bearing portions 14 to the supports 52 can be used. For example, the supports 52 can be U-shape members that are designed to engage the bearing portions 14 and are secured to the carrier 46 by bolts 54 or other suitable fasteners.

The carrier 46 includes a seal member 56 for sealing the carrier 46 to the manifold 42. The seal member 56 is received within a seal groove on the underside of the carrier 46. Accordingly, a separate seal need not be provided during installation of the flapper valve assembly 40 to the manifold 42.

By providing the flapper valve 2 in a flapper valve assembly 40 that is mountable as a unit to a manifold of an engine, installation of the flapper valve assembly 40 can be more efficient than installation of each individual element of the flapper valve assembly 40 to the manifold. Thus, the flapper valve assembly 40 eliminates the need to individually install the flapper valve and/or shaft, bearings, seals, etc., on a manifold, which can often be in a tight space making installation of the various components difficult.

Figure 8:
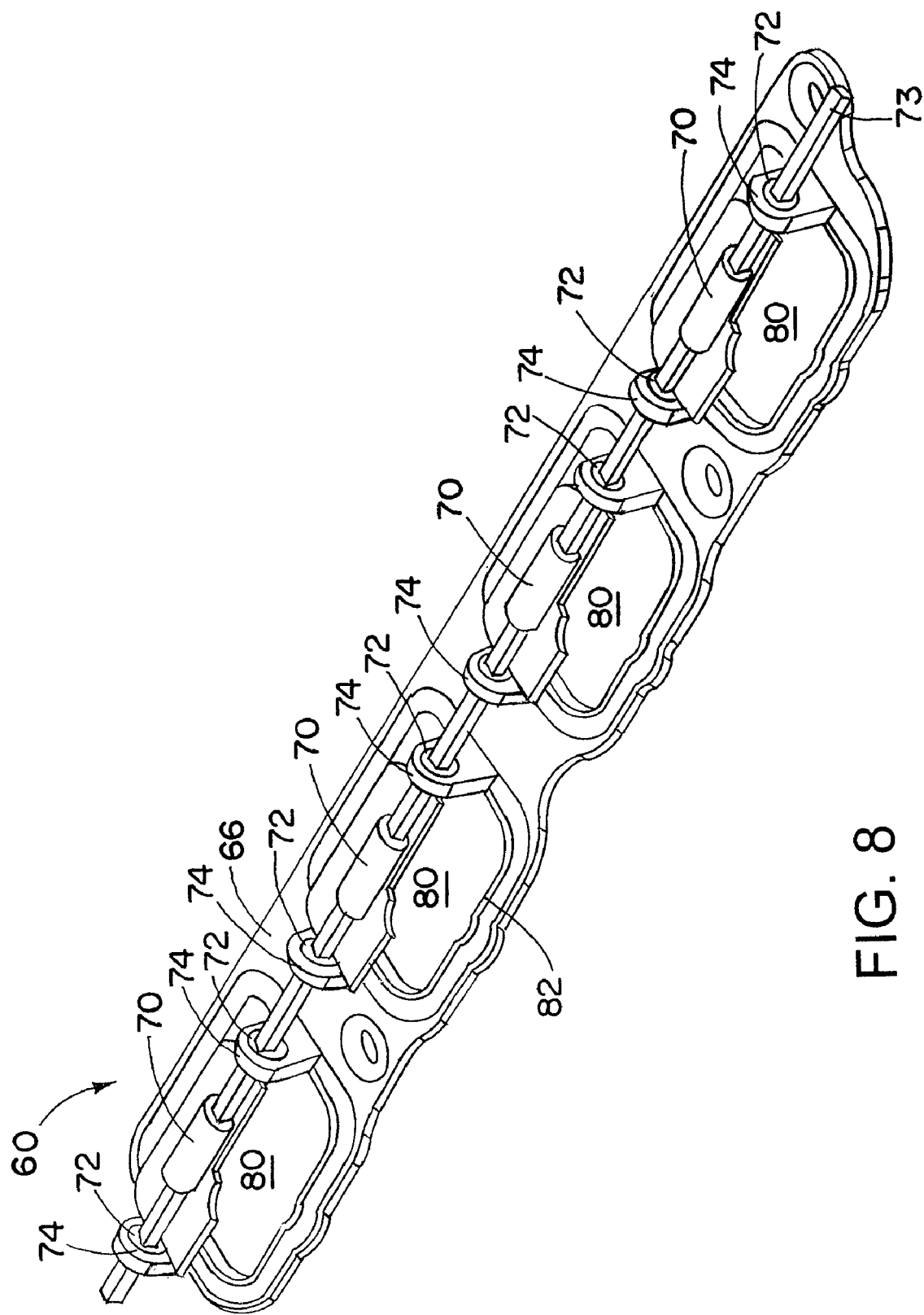
FIG. 8 is a perspective view of another exemplary flapper valve assembly in accordance with the present invention.
Figure 9:
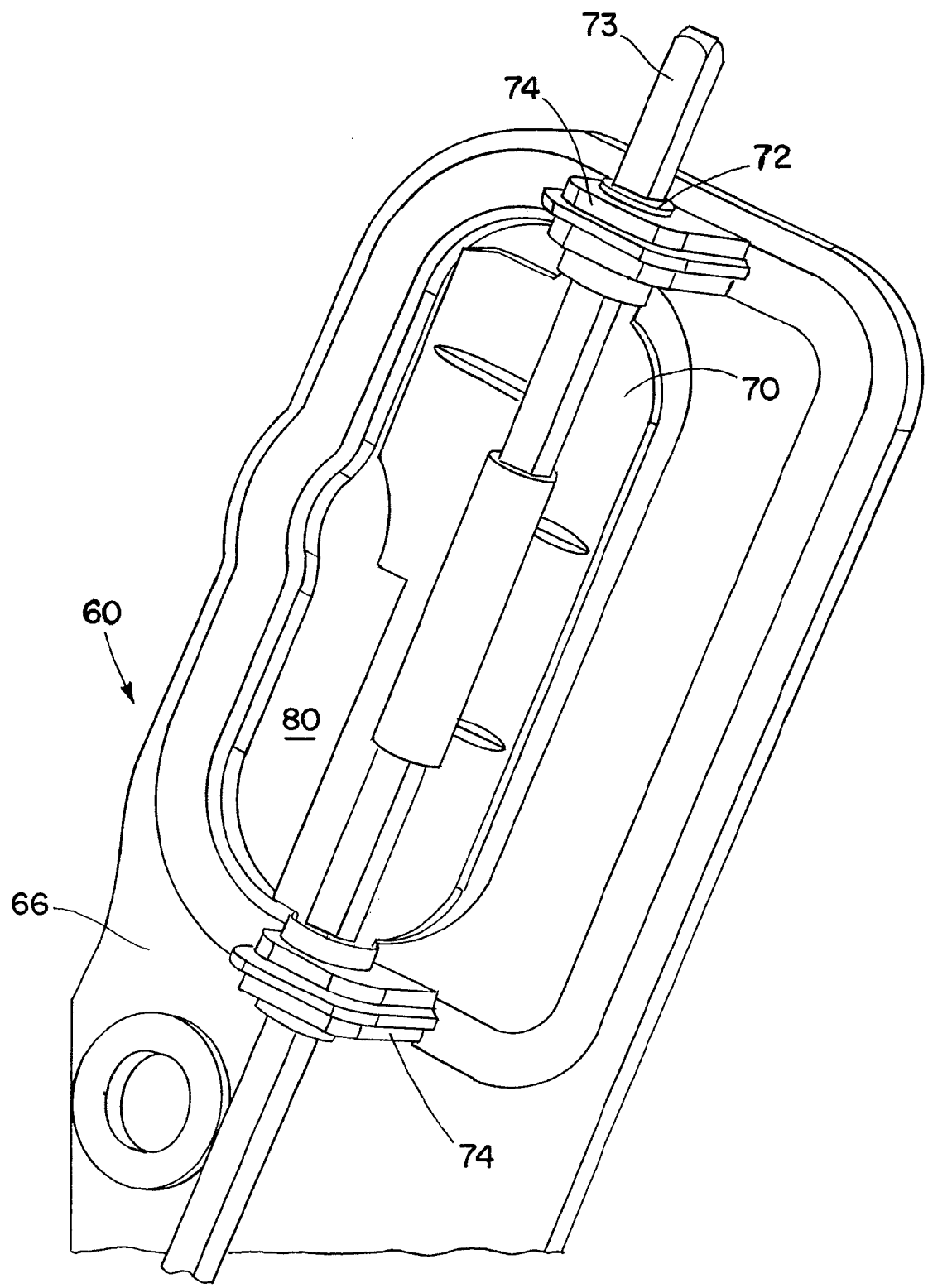
FIG. 9 is an enlarged portion of the flapper valve assembly of FIG. 8.

Turning to FIGS. 8 and 9, another exemplary flapper valve assembly 60 is illustrated. The flapper valve assembly 60 in FIGS. 8 and 9 is similar to the flapper valve assembly 40 in FIG. 7 and includes a flapper valve having flaps 70 and bearings 72 that are telescoped over shaft 73. The flapper valve is supported for rotation by the bearings 72 secured to supports 74 on the carrier 66. The bearings 72 can be separate two-piece bearings, for example, or can be formed integrally with flaps 70 as described in connection with the flapper valve above. Similarly, the flaps 70 can be separate flaps 70 that are fixed against rotation relative to the shaft 74, or the flaps 70 can be molded to the shaft along with the bearings as previously described.

The carrier 66 has openings 80 that are configured to be at least partially blocked or obstructed by the flaps 70 of the flapper valve 62 when the flapper valve 12 is in a closed position. It will be appreciated that the flaps 70 and/or carrier 66 can include a sealing member 82, such as a gasket, for promoting a tight seal between the flaps 70 and carrier 66 when the flapper valve is in a closed position. The carrier 66 can further include a sealing member or gasket for sealing the carrier 66 to the manifold.

Figure 10:
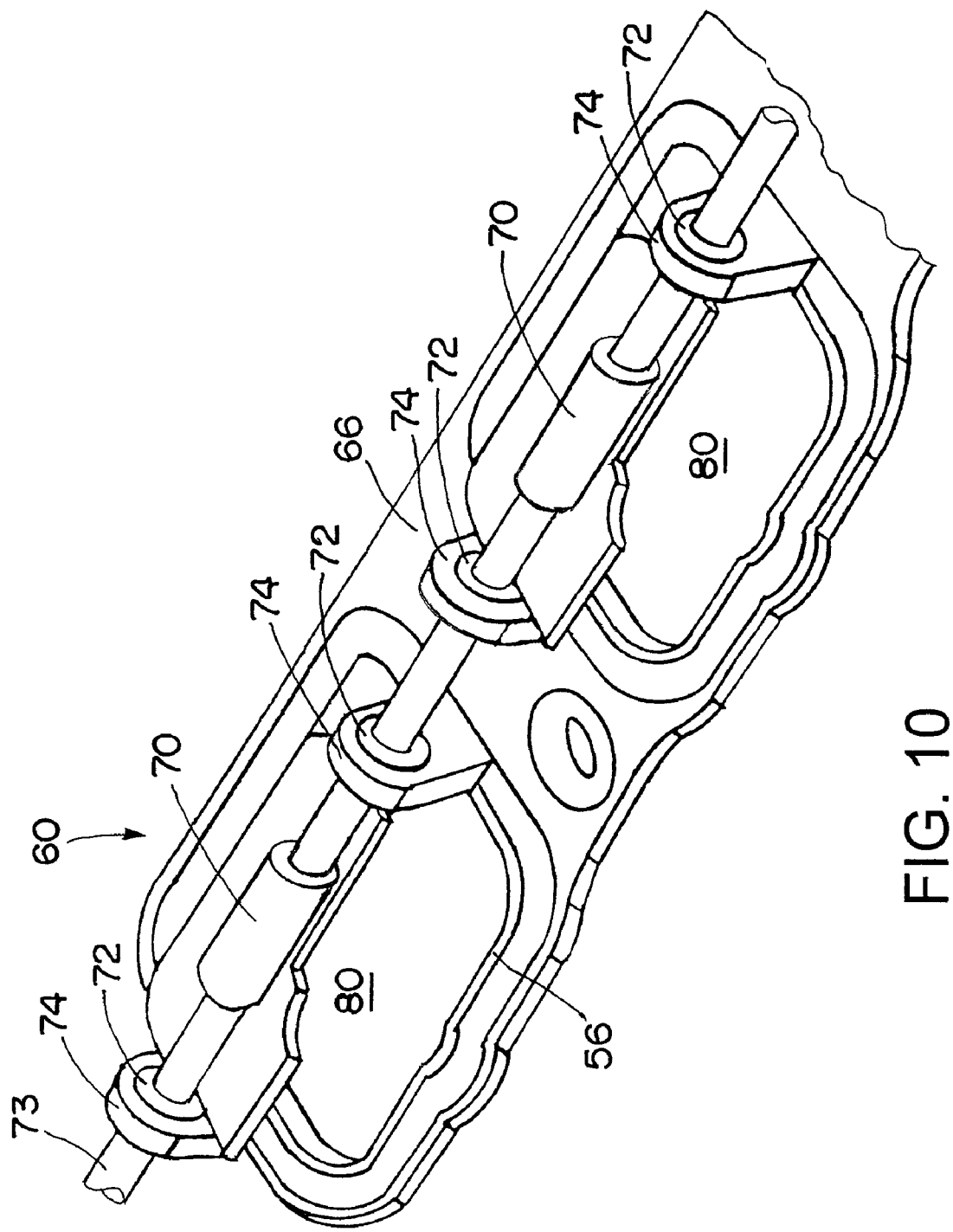
FIG. 10 is a perspective view of yet another exemplary flapper valve assembly in accordance with the present invention.

Turning to FIG. 10, another exemplary flapper valve assembly 60 is illustrated. The flapper valve assembly 60 in FIG. 10 is similar to the flapper valve assembly 60 in FIGS. 8 and 9 and includes a flapper valve having flaps 70 supported on shaft 73, which in turn is supported on carrier 66. In this embodiment, however, bearings 72 are formed as part of the carrier 66. For example, the bearings 72 can be molded onto the carrier 66, welded to the carrier 66, or otherwise formed integrally therewith. The bearings 72 support the generally cylindrical shaft 73 for rotation.

Figure 11:
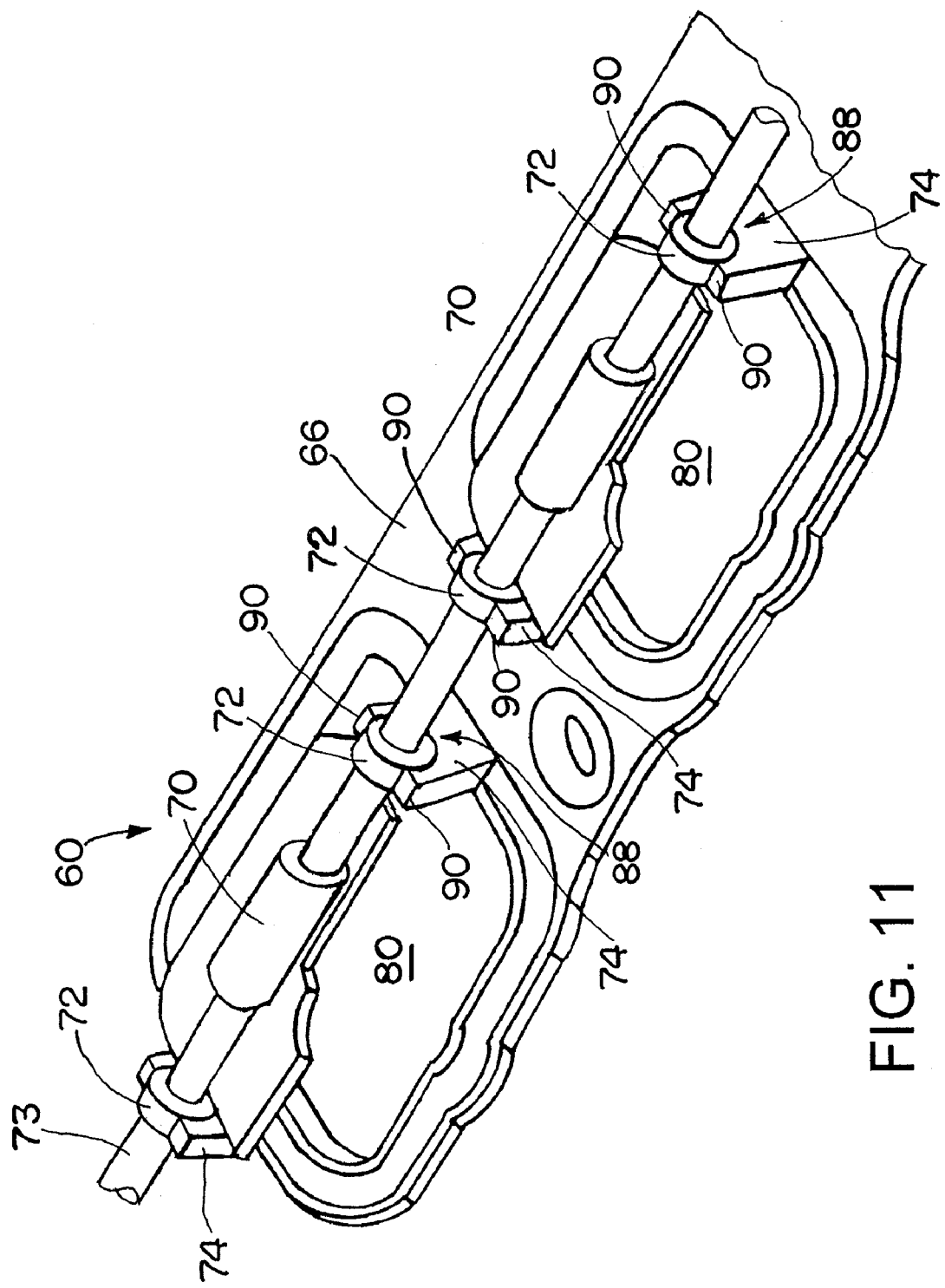
FIG. 11 is a perspective view of still another exemplary flapper valve assembly in accordance with the present invention.

Turning now to FIG. 11, yet another exemplary flapper valve assembly 60 is illustrated. The flapper valve assembly 60 in FIG. 10 is similar to the flapper valve assembly 60 in FIGS. 8 and 9 and includes a flapper valve having flaps 70 supported on shaft 73, which in turn is supported on carrier 66. In this embodiment, the bearings 72 may be separate bearings telescoped over the shaft 73, or molded therewith as described previously. Each bearing 72 is snapped into a respective bearing recess 88 of a support 74. The bearing recesses 88 are generally semi-circular in cross-section and bounded by respective walls 90 of a support 74. The walls 90 can be configured to flex slightly radially outwardly in order to receive the bearings 72 in the recesses 88. Once a bearing 72 is installed in a recess 88, the walls 90 can act to retain the bearing 72 therein by restricting removal of the bearing 72. In this regard, the walls can be configured to surround somewhat more the 50% of a circumference of the bearing 72, for example. Providing an assembly 60 wherein the flapper valve is mountable to the carrier 66 via a snap fit design facilitates ease of construction by allowing the flapper valve and bearing to be snapped into place on the carrier 66.

Although the invention has been shown and described in the context of an intake manifold for an engine, it will be appreciated that aspects of the invention can be used in a wide variety of applications. For example, the invention can be used in connection with a vehicle HVAC system for controlling the flow of air to various areas of a passenger compartment of the vehicle and/or the flow of air to heat exchangers for heating and cooling purposes.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making a flapper valve assembly that is mountable as a unit to an intake manifold of an internal combustion engine comprising the steps of:
   molding at least one flap and at least one bearing portion as a unitary structure on a shaft;
   separating the at least one bearing portion from the at least one flap so that the bearing portion can rotate independently of the flap on the shaft; and
   mounting the at least one bearing portion to a flapper valve carrier so that the shaft is rotatable to move the at least one flap between a sealed position and an unsealed position.

2. A method as set forth in claim 1, wherein the separating includes cutting.

3. A method as set forth in claim 1, wherein the mounting includes snapping the at least one bearing portion into a recess in the carrier.

4. A method as set forth in claim 1, wherein the flap is secured against rotation relative to the shaft.

5. A method as set forth in claim 4, wherein the securing includes molding the at least one flap onto a non-circular portion of the shaft, whereby the flap is secured against rotation relative to the shaft.

6. A method as set forth in claim 1, wherein the shaft is a metallic shaft.

* * * * *